United States Patent [19]

Martini

[11] Patent Number: 4,643,864
[45] Date of Patent: Feb. 17, 1987

[54] PROCESS FOR MAKING SEALING GASKETS

[75] Inventor: Gino Martini, Biella, Italy
[73] Assignee: Tako S.p.A., Turin, Italy
[21] Appl. No.: 695,830
[22] Filed: Jan. 28, 1985

[30] Foreign Application Priority Data

Oct. 1, 1984 [IT] Italy ............................... 67974 A/84

[51] Int. Cl.[4] ............................................. B29C 39/02
[52] U.S. Cl. ........................ 264/220; 249/57;
249/139; 264/36; 264/331.13; 264/331.15;
264/DIG. 67; 425/375; 425/447; 425/DIG. 47
[58] Field of Search ...................... 264/36, 46.7, 279.1,
264/316, DIG. 67, 219, 220, 331.13, 331.15;
249/57, 139; 425/87, 375, 376 R, 458, DIG. 42,
DIG. 47, DIG. 57, DIG. 60, 447

[56] References Cited

U.S. PATENT DOCUMENTS

| | | | |
|---|---|---|---|
| 2,394,327 | 2/1946 | Niessen et al. | 264/46.7 |
| 3,183,285 | 5/1965 | Boylan | 264/46.7 |
| 3,608,055 | 9/1971 | Long | 264/316 |
| 3,946,982 | 3/1976 | Calkins | 249/159 |
| 3,966,166 | 6/1976 | Elliott | 425/DIG. 57 |
| 4,059,564 | 11/1977 | Coughlan et al. | 425/DIG. 47 |
| 4,350,486 | 9/1982 | Croseck et al. | 425/DIG. 60 |
| 4,519,567 | 5/1985 | Rautenberg | 264/279.1 |

Primary Examiner—James Lowe
Attorney, Agent, or Firm—Cushman, Darby & Cushman

[57] ABSTRACT

A thread of a fluid material for gasket manufacture is deposited onto a non-planar, non-adhesive support sheet (12) from a nozzle (22) that is displaced above the support along a path corresponding to the outline of the gasket, with subsequent curing of the fluid material. The support sheet is prepared by pressing sheet material into a tridimensional shape whereby its surface contains the non-planar outline of the gasket to be manufactured; the shaped support is positioned with respect to a nozzle carried by a manipulator (20) capable of being controlled to move the nozzle with respect to the support along three independent spatial coordinates; and the nozzle is fed with said fluid material while being displaced along said non-planar outline. Preferably, the support sheet is kept flattened by vacuum against an underlying, matching surface.

7 Claims, 3 Drawing Figures

U.S. Patent  Feb. 17, 1987  4,643,864
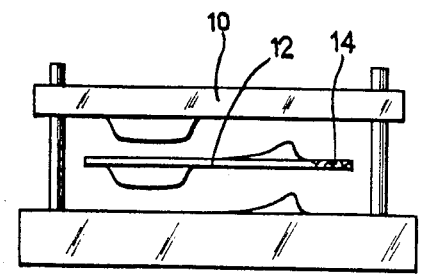
Fig. 1
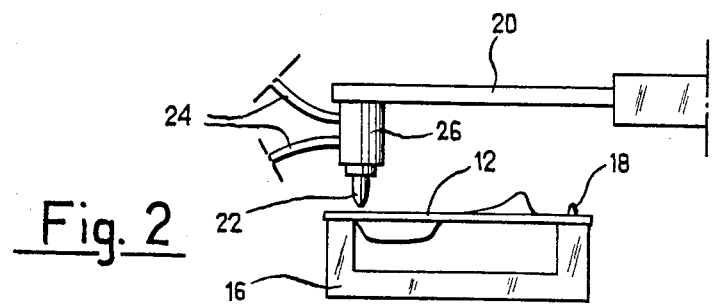
Fig. 2
Fig. 3
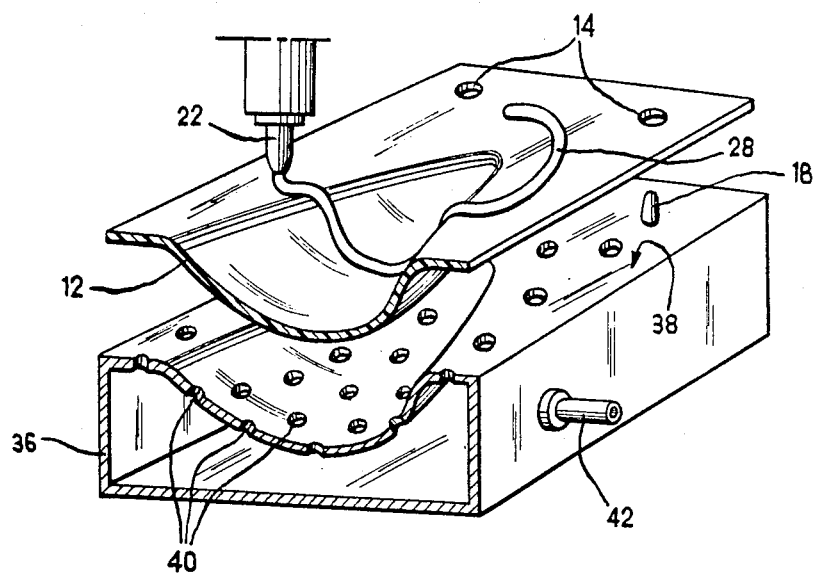

PROCESS FOR MAKING SEALING GASKETS

BACKGROUND OF THE INVENTION

This invention relates to a process for making sealing gaskets by deposition and subsequent curing of elastomeric polymers and the like. The invention is also concerned with the gasket itself as obtained by such process.

Conventional methods of gasket manufacture substantially comprise either punching the gasket out of a (possibly many-layered) sheet material, or shape the gasket by injection-moulding of an elastomeric mix or the like. With both of these methods, but especially with injection moulding, expensive tools (punches and moulds) are required, and this is reflected in a high cost of the gaskets themselves, particularly if only relatively small quantities of such gaskets are to be manufactured.

More recently, new manufacturing methods have been developed, whereby a thread of a fluid elastomer is deposited from a nozzle onto a flat non-adhesive support, e.g. a semirigid sheet of a material such as PVC, following the outline of the gasket, and subsequently the fluid elastomer is cured, either at ambient temperature or in an oven, with or without accelerators or other addities. The nozzle is displaced by numerical control pantograph devices or the like, and it runs along two horizontal coordinates, parallelly to the plane of the support sheet, while depositing on it a thread of elastomer or other suitable resin. The gasket so obtained is often supplied to the end user while still sticking (with a weak adhesion) to the support sheet itself, to be peeled away before use.

The above manufacturing process by deposition of a fluid polymer gives rise to gaskets that can often be used as replacements for injection-moulded gaskets, with definitely lower tooling costs, particularly in the case of gaskets having an intricate pattern. However, such process was limited to flat gaskets, while for tridimensional gaskets only injection-moulding has been used.

Even more recently, manufacturers of end products such as engines, motorcars and the like, in order to reduce costs of seals between surfaces, have in some cases dispensed with a gasket altogether, and have instead resorted to the expedient of depositing a thread of an elastomer directly on the surface of the part, the thread-producing nozzle being displaced by means of numerical control devices capable of moving along three coordinates. Costs have thereby been reduced in the original equipment, but a problem has arisen with spare parts, because the same method cannot be used there and, on the other hand, the high cost of injection-moulding discourages manufacturers from tooling up in order to supply the spare part market alone. Therefore, operators in these cases have had to overcome the difficulty by manually depositing a fresh thread of elastomer on the part. This approach is unsatisfactory, because manual deposition is time-consuming and requires an appreciable degree of expertise, while the quality of the result in each case depends critically on the operator's manual skill.

SUMMARY OF THE INVENTION

The main object of this invention is therefore to provide a process for manufacturing sealing gaskets by depositing fluid material from a nozzle, whereby gaskets having a tridimensional layout can be obtained, while keeping manufacturing cost at a level comparable with flat gaskets, and without a need for costly investments in tooling up, so that manufacture can be economically attractive even for the spare part market alone.

A further object is to provide an alternative to direct deposition even in original equipment, in order to obviate breakdowns or temporary difficulties in the assembly line, which would otherwise entail a production stop.

The invention achieves the above and other objects, such as they will appear from the following disclosure, with a process for making sealing gaskets, wherein a thread of a fluid material for gasket manufacture is deposited onto a non-adhesive support from a nozzle that is displaced above the support along a path coinciding with the outline of the gasket, with subsequent curing of the fluid material, characterized in that it comprises the following steps:

(a) preparing a support by pressing sheet material into a tridimensional shape whereby the sheet surface contains the non-planar outline of the gasket to be manufactured;

(b) positioning the shaped support with respect to a nozzle carried by a manipulator capable of being controlled to move the nozzle with respect to the support along three independent spatial coordinates;

(c) moving the nozzle along said non-planar outline while feeding it with said fluid material.

BRIEF DESCRIPTION OF THE DRAWINGS

Preferred embodiments of the invention will now be described as non-limiting examples, with reference to the attached drawings, wherein:

FIG. 1 is a diagrammatical view of the moulding step of a support which is part of the inventive process;

FIG. 2 is a diagrammatical view of a manufacturing step according to the inventive process;

FIG. 3 is an exploded, broken-away, prospective view of the deposition step of a thread of fluid material upon the support.

DESCRIPTION OF PREFERRED EMBODIMENTS

With reference to FIG. 1, according to the inventive process a sheet 12, of a material suitable to act as a support for deposition of a fluid material, say a rigid or semirigid PVC sheet, is hot-pressed in a mould 10 in a way to shape the support with a non-planar surface containing the outline of the gasket that must be manufactured. At the same time, mould 10 should punch two or more reference holes 14 in sheet 12, although other means of reference could be substituted for the holes. It should be noted that the mould required to shape the support sheet is by far less expensive than the mould required for injection-moulding an equivalent gasket: therefore the initial investment in mould 10 is economically justified even for relatively small productions.

The support sheet thus shaped is then treated to be non-adhesive, (unless it has an inherent non-adhesivity) by means known per se, and therefore not described here.

With reference to FIG. 2, support 12 is now placed on a stand 16, having reference dowels 18 matching holes 14. A manipulator 20, such as a robot capable of moving along three spatial coordinates, carries a deposition nozzle 22 for depositing a fluid elastomer, such as a bicomponent material, which is fed to a mixer 26 through flexible tubes 24, the mixer in turn feeding nozzle 22. Manipulator 20 is controlled by control means known per se, such as a control computer, to move the nozzle along a spatial path, with respect to support 12, such that the nozzle stays at a constant distance from the support surface, while following the ideal layout of the tridimensional gasket required. At the same time, nozzle 22 is fed with fluid elastomer. The flow of elastomer is such that a thread 28 having a desired gauge (see also FIG. 3) is deposited onto the support. The gauge of thread 28 may be varied along the path, by modulating the flow of material to be nozzle. Accurately defined gaskets can thus be obtained, having everywhere a thickness adequate to the pressures that the gasket is intended to withstand.

FIG. 3 shows an improved stand 36 which is particularly desirable when the material of the support sheet is thin and pliable. Under such circumstances, the support sheet might be locally displaced from its correct position by irregular friction with respect to the stand or to the fluid material that is being deposited by the nozzle. Such irregular displacement would distort the flat surface of the support sheet, giving rise to bumps and hollows which would change the distance of the sheet from the nozzle. The material deliverd by the nozzle would thus be flattened out on the support surface, and the thickness of the thread, for a given flow of material, would not be accurate, and especially it would not be repeatable from one gasket to the next.

The stand of FIG. 3 therefore is made as a closed casing 36 having a roof 38 shaped to match the shape of the support sheet 12, the roof being further perforated as in 40 in the area underneath the support sheet. A pipe fitting 42 is provided in a wall of casing 36, and is connected to a vacuum pump (not shown) after placing the support sheet on the roof 38 of the casing. The support sheet is thereby kept securely in place, and will not be displaced during the deposition of the thread.

The gasket obtained by the above process will generally be marketed together with its support, so that it suffers no distortion during prolonged storage, and the end user will peel it off the support before use. If the support is properly designed, i.e. with sloping surfaces, the supports with their adhering gaskets can be stacked close together, and the bulk of the stock will be reduced to a minimum.

Materials suitable for carrying out the invention are the same that have been used in the manufacture of nozzle-deposited flat gaskets, e.g. monocomponent or bicomponent silicone materials, polyurethanes, or even PVC, with or without a mixed catalyzer, for either hot or cold curing. In general, any kind of elastomeric material can be used, and sometimes even other kinds of synthetic resins.

While the material presently preferred for the support is PVC, as mentioned above, because of its easy pressing and low cost, other materials can also be contemplated, such as polyethylene or polystyrene. The rigidity of the material may also vary in a wide range. However, in the case of semirigid sheets, the support stand during deposition should provide a distributed abutting surface, in order to insure that the support shape is maintained.

The nozzle-displacing manipulator can be one of several well-known robots, having at least three independent displacement coordinates, such as a robot with three rectangular axes, or one with cylindrical coordinates. As an alternative, the nozzle could be displaced only along two horizontal axes, the support stand being driven along a vertical axis. This approach is equivalent within the teachings of the invention.

Although a preferred embodiment of the invention has been described, it is understood that equivalent modifications may be brought to it within the scope of the invention.

I claim:

1. A process for making sealing gaskets for use in replacement of directly deposited sealing members, comprising:
   (a) preparing a support sheet by pressing sheet material into a tri-dimensional shape such that the sheet surface contains the non-planar outline of the gasket to be manufactured;
   (b) positioning the shaped support with respect to a material-dispensing nozzle carried by a manipulator capable of being controlled to move the nozzle with respect to the support along three independent spatial coordinates;
   (c) moving the nozzle along said non-planar outline while feeding the nozzle with a fluid, curable material of a relatively high viscosity, the speed of the nozzle and the flow of material being controlled so that a desired gauge of the thread of material is obtained;
   (d) curing the fluid material deposited on the support sheet.

2. The process of claim 1, wherein the support sheet is positioned with respect to the nozzle by placing it on the surface of a stand, said surface matched to the shape of the support sheet, said surface being perforated and subjected to vacuum in order to maintain the support sheet securely flattened against the stand.

3. The process of claim 1, wherein said fluid material for gasket manufacture is a monocomponent polymer.

4. The process of claim 1, wherein said fluid material for gasket manufacture is a bicomponent polymer.

5. The process of claim 1, wherein said fluid material for gasket manufacture is an elastomer.

6. The process of claim 1, wherein the fluid material is one of the class of: silicones, polyurethanes, PVC.

7. The process of claim 1, wherein the support material is PVC.

* * * * *